W. B. BIZZELL.
Saw-Filing Machine.

No. 163,970. Patented June 1, 1875.

WITNESSES:
Chas. Nide
Sedgwick

INVENTOR:
W. B. Bizzell
BY
ATTORNEYS.

UNITED STATES PATENT OFFICE.

WILLIAM B. BIZZELL, OF LA GRANGE, NORTH CAROLINA, ASSIGNOR TO HIMSELF AND W. H. HARDEE, OF SAME PLACE.

IMPROVEMENT IN SAW-FILING MACHINES.

Specification forming part of Letters Patent No. 163,970, dated June 1, 1875; application filed December 20, 1873.

*To all whom it may concern:*

Be it known that I, WILLIAM B. BIZZELL, of La Grange, in the county of Lenoir and State of North Carolina, have invented a new and Improved Saw-Filing Machine, of which the following is a specification:

This invention is an improvement on the saw-filing machine patented to William H. Bizzell July 1, 1873, which consists mainly of a circular frame which moves along the bed-frame in which the saw is clamped, and carries the saw-frame above the saw to shift the file from tooth to tooth, the said saw-frame being capable to shift around the circular frame to adjust the file to the angle of the teeth; and the invention consists of a peculiar feeding-gage by which to shift the file-frame and the circular frame in which it rests along the saw to shift the file from tooth to tooth, all as hereinafter described.

Figure 1:
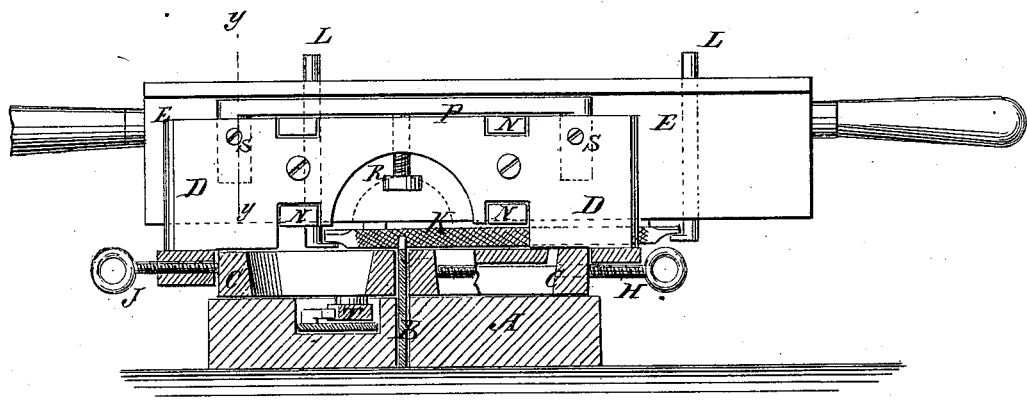
Figure 2:
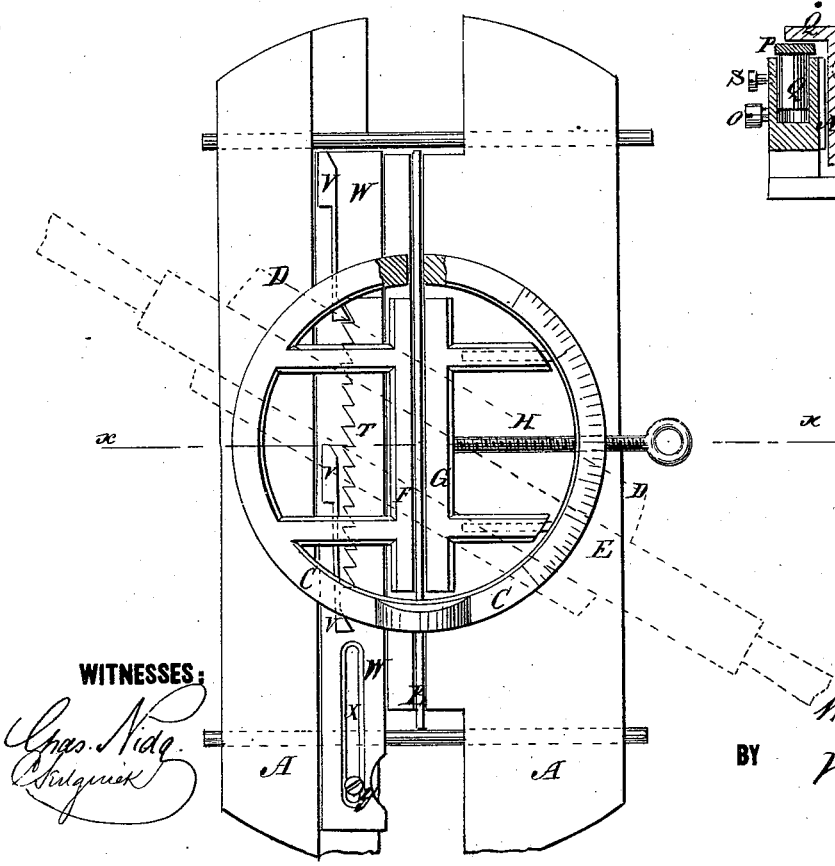
Figure 3:
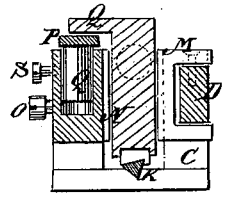

Figure 1 is a sectional elevation of my improved saw-filing machine, taken on the line $x\ x$, Fig. 2. Fig. 2 is a plan view, with the file-frame and file-stock shown in dotted lines; and Fig. 3 is a section of the file-frame and file-stock taken on the line $y\ y$, Fig. 1.

A is the bed-frame in which the saw B is clamped to be held for filing it. C is the circular frame, which rests on the bed-frame A, for holding the file-frame, which is represented at D, and the file-stock, which is mounted in said file-frame, and which feeds them along the saw-frame $a$ to shift the file from tooth to tooth. The circular frame is fastened to the saw to hold it while the file is working, by the stationary jaw F, movable jaw G, and the binding-screw H. The file-frame rests on the circular frame, so as to be shifted around its axis horizontally to adjust the file-stock to the angle of the teeth, and it is fastened at any required point by the binding-screw J. The file-stock slides backward and forward in the file-frame, which has a deep groove in the middle of the top for it, and it carries the file K at its lower edge, said file being clamped to it by the hook-headed bolts L.

The machine, as above described, is the same as that described in the aforesaid patent, and is only here again described for the better understanding of my present improvements, which consist of a notched ratchet-bar, T, on the shifting or feeding frame C, and the spring ratchet-pawls V on the bed A, by which to adjust the file along from tooth to tooth, the ratchet-bar being detachable for the application of interchangeable ones, differing in the pitch of their teeth, to correspond with saws having teeth of different pitch, and the spring-pawls V being on a plate, W, which is capable of shifting lengthwise for setting the pawls to the ratchet-bar after the file is adjusted in the first notch of the saw. Said plate has a slot, X, in it, through which a set-screw, Y, passes to fasten it after it is adjusted. As the ratchet-bar T can only be as long as the diameter of the frame C, and would therefore be too short for feeding said frame the whole length of the saw, I use several spring-pawls, V, on the shifting-plate W, placed about as far apart as the length of the bar, so that as the latter escapes from one pawl it will be engaged by another, and thus will be moved the whole length of the saw.

Having thus described my invention, I claim as new and desire to secure by Letters Patent—

The notched ratchet-bar T and spring-pawls V, arranged on a shifting-plate, combined with the feeding-frame C, as and for the purpose specified.

WILLIAM BRYANT BIZZELL.

Witnesses:
   W. T. BEST,
   JAS. A. MAY.